Aug. 19, 1930.  A. W. SIZER  1,773,552
MOLDING MACHINE
Filed Aug. 21, 1928    2 Sheets-Sheet 1

INVENTOR
Albert W. Sizer,
BY
Stuwart & Mason
ATTORNEYS.

Aug. 19, 1930.    A. W. SIZER    1,773,552
MOLDING MACHINE
Filed Aug. 21, 1928    2 Sheets-Sheet 2

INVENTOR
Albert W. Sizer,
BY
ATTORNEYS.

Patented Aug. 19, 1930

1,773,552

UNITED STATES PATENT OFFICE

ALBERT WILLIAM SIZER, OF HESSLE, ENGLAND

MOLDING MACHINE

Application filed August 21, 1928, Serial No. 301,149, and in Great Britain November 8, 1927.

The present invention relates to improvements in continuous molding machines of the type in which material is forced by means of a worm continuously through a die plate.

An object of the present invention is to provide a machine which will mold material in the form of small pellets, such as would be suitable for use as a poultry food. The material may be in the form of mixtures of vegetable meals, animal waste, fish meal and the like. Certain difficulties have prevented the successful manufacture of such material in pellet form. With a view to avoiding such disadvantages according to the present invention a feed worm is provided in which the threading along the major proportion of the body is of considerably less diameter than the internal diameter of the worm casing; whilst the feed end of the worm terminates in a thread extending substantially half way round the periphery only, which threading is substantially equal in diameter to the internal diameter of the casing.

The invention is more particularly described with reference to the accompanying drawings in which:—

Figure 1:
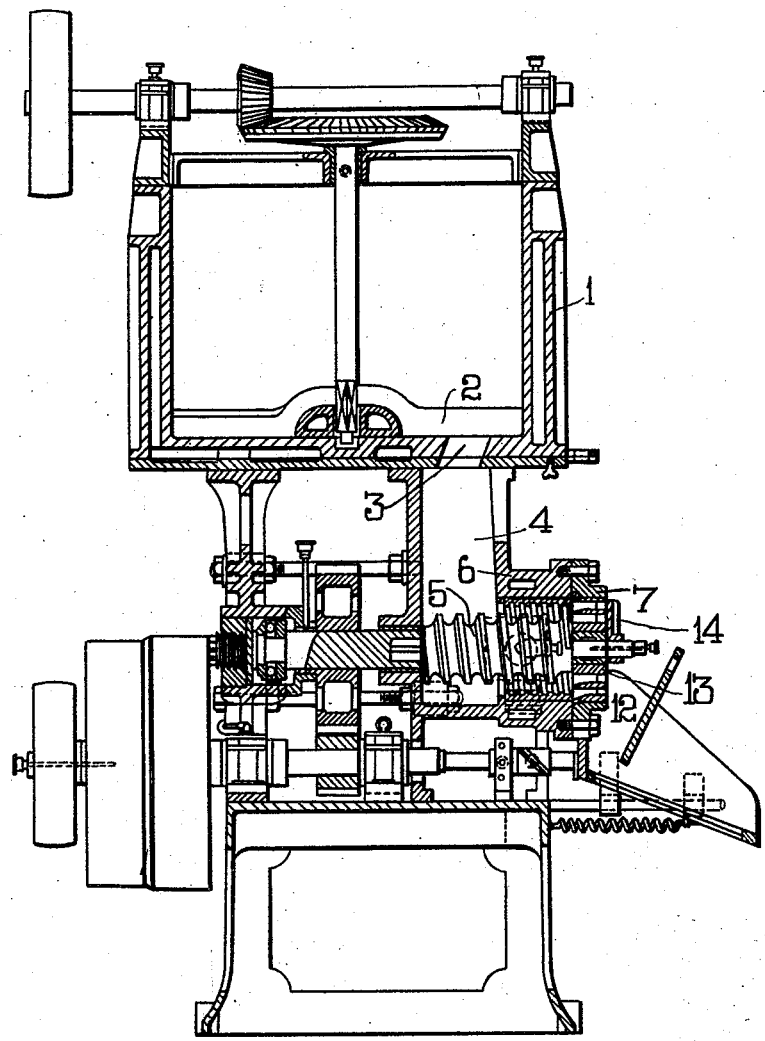
Figure 1 is a sectional elevation of one form of construction of machine.
Figure 2:
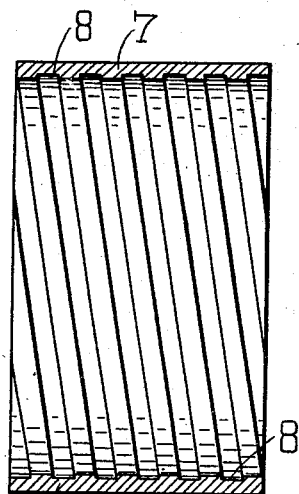
Figure 2 is a sectional detail view of the liner for the casing co-operating with the feed worm.
Figure 3:
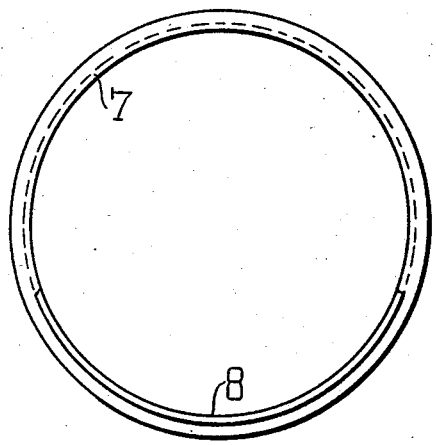
Figure 3 is a corresponding end view.
Figures 4, 5:
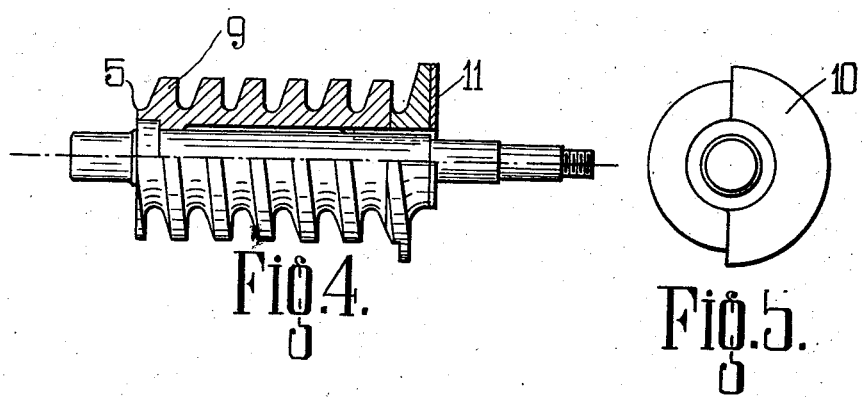
Figure 4 is a side elevation of a preferred form of construction of worm.
Figure 5 is a corresponding front elevation.

The machine in a convenient form comprises a jacketed hopper 1 having stirrer arms 2 feeding material through a perforation in the base 3 to the feed chute 4 of a conveyor worm 5. The conveyor worm rotates within a casing 6 provided with a liner 7 which has a helical grooving 8 of reverse but different pitch to the pitch of the thread on the worm 5. Further as shown in Figure 3, the grooves 8 are preferably eccentric to be deeper at the top than at the bottom of the liner.

The worm 5 has a threading 9 which for the major proportion of its length is of considerably less external diameter preferably about four-fifths of the internal diameter of the liner 7, but terminates in a half thread convolution 10 of full diameter. The feed end of the worm may if desired, be provided with a detachable and renewable slipper 11.

It will be found in use that this type of worm allows the meal to escape over the worm in order to relieve excess pressure on the small holes 12 of the die plate 13 where the meal is extruded in the form of long narrow section ribbons which are severed periodically into short pellets by means of a rotating blade 14. Instead of forming the threads of the worm in their reduced proportion along the major proportion of the length of the worm parallel, the external diameter of the thread may be slightly tapering away from the feed end of the worm.

In certain cases it may be desirable to arrange that the worm whilst of narrower diameter along the greater proportion of its length, extends in a partial or whole convolution of a diameter intermediate that of the reduced portion of the worm, and that of the full half section convolution, or again there may be three or more steps.

I declare that what I claim is:—

A molding machine comprising a casing, a hopper at one end of said casing, a die plate closing the opposite end of said casing, a feed worm in said casing, the thread of said feed worm being of considerably lesser external diameter than the internal diameter of the casing for the greater portion of its length and terminating at the die plate end in a half convolution of substantially the full internal diameter of the casing so that excess pressure on the material around the worm at the die plate may be relieved backward along the worm, the end of the worm thread closely engaging the inner face of the die plate whereby to force the material therethrough, and a severing device actuated with the worm and cooperating with the die plate at the outer side thereof, whereby pellets of substantially uniform size and density may be formed.

In witness whereof, I have hereunto signed my name this 1st day of August, 1928.

ALBERT WILLIAM SIZER.